United States Patent [19]

Bennett

[11] 4,337,855
[45] Jul. 6, 1982

[54] MULTIPLE ARMATURE RING AND SPRING MOUNTING ARRANGEMENT FOR ELECTROMAGNETIC FRICTION-TYPE CLUTCHES AND BRAKES

[75] Inventor: George T. Bennett, Kettering, Ohio

[73] Assignee: General Motors Corporation, Detroit, Mich.

[21] Appl. No.: 147,490

[22] Filed: May 7, 1980

[51] Int. Cl.³ ............................................. F16D 27/07
[52] U.S. Cl. ................................. 192/84 A; 188/163; 192/89 B
[58] Field of Search ................. 192/84 A, 84 B, 84 C, 192/89 B; 188/161, 163

[56] References Cited

U.S. PATENT DOCUMENTS

| | | | |
|---|---|---|---|
| 3,055,475 | 9/1962 | Pitts, Jr. | 192/84 C |
| 3,082,933 | 3/1963 | Bernard | 230/15 |
| 3,092,307 | 6/1963 | Heidorn | 192/84 A |
| 3,190,419 | 6/1965 | Heidorn | 192/84 R |

Primary Examiner—Allan D. Herrmann
Attorney, Agent, or Firm—R. L. Phillips

[57] ABSTRACT

An electromagnetic friction-type clutch (brake) is provided with a multiple armature ring and spring mounting arrangement which operates to effect an air gap across the flux path during disengagement to dissipate residual magnetism and thereby allow a relatively small release force to complete the disengagement.

3 Claims, 2 Drawing Figures

MULTIPLE ARMATURE RING AND SPRING MOUNTING ARRANGEMENT FOR ELECTROMAGNETIC FRICTION-TYPE CLUTCHES AND BRAKES

This invention relates to an improved multiple armature ring and spring mounting arrangement for electromagnetic friction-type clutches and brakes and more particularly to such an arrangement for use in those clutches and brakes whose release or disengagement may be impeded by residual magnetism.

The present invention is directed to improvements in electromagnetic friction-type clutches and brakes having multiple armature rings which are mounted by a spring arrangement on one of two relatively rotatable members. On energization of a solenoid mounted on the other member these armature rings are caused to separately frictionally engage respective pole faces on such other member and commonly frictionally engage an interpole face on such other member. And it is important to note at this point that because of such armature ring and pole face arrangement, there will be commonly occur more wear at the radially outermost armature ring and pole faces because of the larger relative angular velocity during slippage. On deenergization of the solenoid the armature rings are caused to disengage by the spring arrangement against the resistance of any residual magnetism that might exist. Concerning such impedance to disengagement, it is well known that an air gap in the magnetic flux field is useful in that it can be sized to offer sufficient resistance to the magnetic flux to dissipate such residual magnetism to allow the full force of the spring arrangement to effect release or disengagement. Dependent upon the solenoid and armature arrangement, there may or may not exist an inherent air gap in the flux path when the solenoid is deenergized. In those cases such as with a rotary solenoid arrangement where there is no such inherent air gap, it is known to provide some built-in flux resistance across the flux path where relative rotation does not occur. For example, there may be disposed across the flux path such as in the pole piece around the solenoid some non-magnetic material or a bridged slot arrangement. Alternatively, no such added flux resistance may be provided and instead the spring release force is simply increased to offset any residual magnetism. However, the latter has a definite drawback in that it has the effect of reducing the torque capacity since it opposes the magnetic force during the clutch or brake engagement. Another approach has been to apply reverse polarity at disengagement but this requires special electronic circuitry which may include an additional opposite-polarity power supply.

The present invention follows none of these conventional approaches and instead solves the residual magnetism problem with simple inexpensive structural changes in the armature ring and spring mounting arrangement. In the preferred embodiment and as applied to a dual armature ring electromagnetic friction-type clutch or brake, this is effected with a plurality of leaf springs which are each fixed at spaced points along the length thereof to one of the two relatively rotatable members and both the armwture rings. The armature rings are concentrically arranged radially opposite each other in a conventional manner and are commonly referred to as inner or outer according to their relative radial locations. The spring attaching points are spaced so that with respect to each spring there is provided a long effective leaf spring section between the said one member and the outer armature ring where wear is the most and a short effective leaf spring section between the inner and outer armature rings, the latter ring being where wear is the least.

In addition, the outer armature ring is provided with substantially more engagement travel than the inner armature ring so that on energization the inner armature ring engages before the outer armature ring with deflection first of the long leaf spring sections. On such engagement, the inner armature ring then serves as a fulcrum for the short leaf spring sections which are then deflected as the outer armature ring is brought to engagement by the magnetic force. Because of the substantial difference in the effective spring lengths, a substantially larger spring force must be overcome to establish the outer armature ring engagement. Then on deenergization the larger spring force thus stored in the short leaf spring sections is effective to overcome the residual magnetism and causes the outer armature ring to first disengage whereupon there is then effected an air gap in the magnetic flux path to dissipate the residual magnetism to permit the inner armature ring to then be disengaged with just the relatively small spring force of the long leaf spring sections. Since the spring force of the long leaf spring sections is not required to overcome residual magnetism to effect release, they may thus be designed to provide release forces less than that in those clutches and brakes where there is no such air gap or magnetic flux resistance and therefore, the effective torque capacity of the inner armature ring can be effectively increased without other change. Furthermore, since there is no actual air gap or shunt in the flux path the torque capacity is thereby even further increased as compared with conventional arrangements which have same.

These and other objects and advantages of the present invention will become more apparent from the following description and drawing in which.

Figure 1:
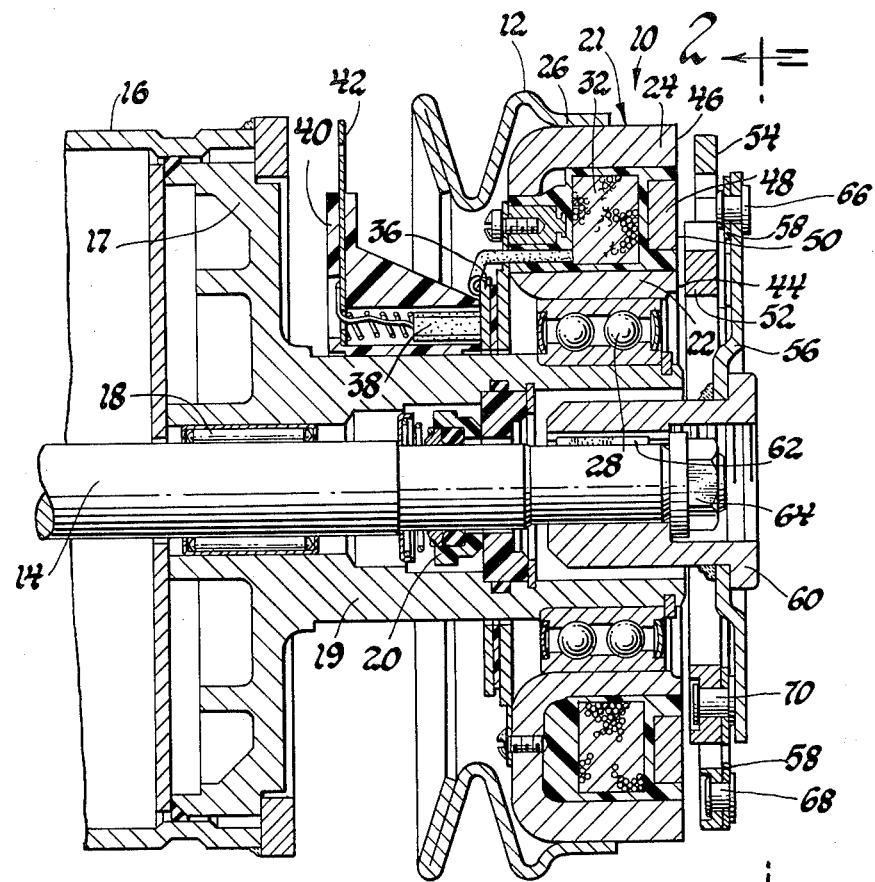
FIG. 1 is a longitudinal sectional view of an electromagnetic friction-type clutch having incorporated therein a preferred embodiment of the present invention.

Referring to FIG. 1 of the drawing, there is shown an electromagnetic friction-type clutch 10 which is particularly adapted to clutch a pulley 12 to the drive shaft 14 of a refrigerant compressor 16. The compressor is of a conventional type with the shaft 14 rotatably supported in a pair of axially spaced needle bearings 18 of which only the one that is mounted in the discharge head 17 of the compressor is shown. The shaft 14 extends through a tubular extension 19 rightward of the discharge head 17 and outboard of the righthand bearing 18 and is sealed within the tubular extension by a rotary seal arrangement 20.

The clutch 10 has a rotary solenoid arrangement and comprises a rotary pole piece 21 having a C-section with concentric, axially extending, inner and outer legs 22 and 24. The outer leg 24 is welded at its outer diameter to an axially extending flange 26 of the pulley while the inner leg 22 is mounted at its inner diameter by a double-row ball bearing 28 on the end of tubular extension 19. A solenoid 32 is potted in the rotary pole piece 21 and is connected through the backside thereof to a slip ring 36 that is mounted on, but electrically insulated from, the rotary pole piece. Slip ring 36 is engaged by a spring biased brush 38 which is supported in a brush holder 40 that is mounted on the tubular extension 19 between the slip ring 36 and discharge head 17. The brush 38 is connected by a bayonet connector 42 to a conventional control circuit, not shown, which it will be understood is operable to energize the solenoid to run the compressor as required.

The annular ends of the pole piece legs 22 and 24 are co-planar, i.e. lie on the same radial plane, to provide a pair of concentric annular pole faces 44 and 46. In addition, there is mounted in the rotary pole piece 21 an interpole ring 48 having a pole face 50 which is intermediate of and co-planar with the radially spaced inner and outer pole faces 44 and 46.

The inner and outer pole faces 44 and 46 are separately frictionally engaged by inner and outer armature rings 52 and 54 which are mounted on a rigid plate 56 by a spring arrangement comprising three leaf springs 58. The plate 56 is welded to a hub 60 which is secured by a key and slot 62 and a nut 64 to the righthand end of the compressor shaft 14.

Figure 2:
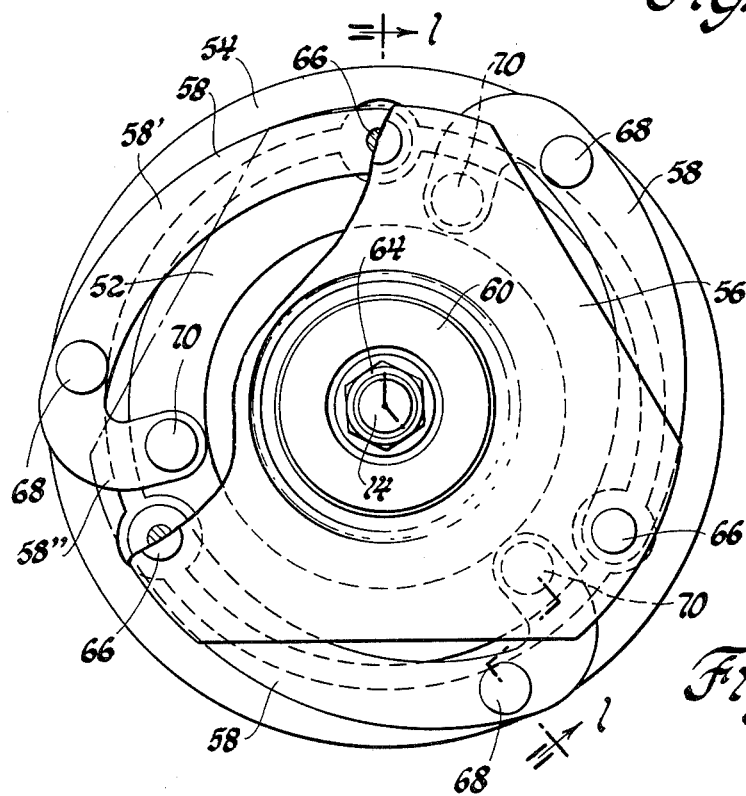
FIG. 2 is a view taken along the line 2—2 in FIG. 1.

As shown in FIG. 2, each of the leaf springs 58 has a generally hook-shape and is fixed at spaced points along the length thereof to the drive plate 56 and the inner and outer armature rings 52 and 54 by a plate rivet 66, outer armature ring rivet 68 and inner armature ring rivet 70, respectively. The spacing is such that with respect to each spring there is a long effective leaf spring section 58' of generally arcuate shape extending between the drive plate 56 and the outer armature ring 54 and a short effective leaf spring section 58" at the hook-end extending radially inward between the outer armature ring 54 and the inner armature ring 52. In addition and as shown in FIG. 1, the outer armature ring 54 is made substantially thinner than the inner armature ring 52 (measured in the axial direction) so as to require substantially more engagement travel (axial travel) of the outer armature ring 54 to engage with the outer pole face 46 and the interpole face 50 than is required of the inner armature ring 52 to engage with the interpole face 50 and the inner pole face 44. For example, in an actual construction of the clutch shown it was found that the desired operation thereof as about to be described was obtained with 0.025" travel of the inner armature ring 52 and 0.030" travel of the outer armature ring 54. Furthermore, to assure that such engagement travel differential is maintained throughout the clutch (brake) wear life and recognizing that the magnetic holding force increases with decreasing pole face engagement area, it was found best to have the inner armature pole face area at engagement at least equal to or greater than that at the outer armature ring.

With above described spring mounting and inner and outer armature ring arrangement, and on energization of the solenoid 32, the magnetic attraction on the armature rings 52 and 54 causes their movement toward the pole faces resulting first in the deflection of the long leaf spring sections 58' with both armature rings thereby moving conjointly. As a result, the inner armature ring 52 engages first with the inner pole face 44 and the interpole face 50 and is thereby stopped in the axial direction to thereafter provide a fulcrum for the short leaf sections 58" whereupon they are then deflected as the outer armature ring 54 continues to be forced by the magnetic field to engage with the outer pole face 46 and the interpole face 50. Because of the substantial difference in the effective lengths of the spring sections 58' and 58", a substantially larger spring force must be overcome to establish such subsequent engagement of the outer armature ring 54. The spring force thus stored in the short leaf spring sections 58" is determined so that on deenergization of the solenoid 32 it is effective to overcome any predictable residual magnetism in the flux path and cause the outer armature ring 54 to immediately disengage whereupon there is effected an air gap in the magnetic flux path to dissipate this residual magnetism and thereby permit the inner armature ring 52 to then be disengaged with just the relatively low spring force of the long leaf spring sections 58'. And as a further feature, the heads of the rivets 70 holding the inner armature ring 52 are made to rest against the flat drive plate 56 when the solenoid is deenergized to thereby cause a light preload on the leaf springs when the armature rings are disengaged to prevent their rattle against the drive plate.

It will be understood by those skilled in the art that while the preferred embodiment of the present invention has been disclosed in use in a clutch, the invention is also applicable to a brake bearing in mind that in either case, the armature rings are mounted by the spring arrangement on one of two rotative rotatable members of the clutch or brake and are operated on energization of a solenoid mounted on the other member to frictionally engage the pole faces on such other member. Furthermore, it will be appreciated by those skilled in the art that while the preferred embodiment of the present invention has been demonstrated in use with a pair of armature rings, the invention is further applicable to a clutch or brake having more than two armature rings. In that case, the spring arrangement of the present invention would be modified such that the radially outermost armature ring is first disengaged on solenoid deenergization with the larger spring force and then on establishment of the air gap all the armature rings radially inward thereof are disengaged with the smaller spring force.

The above described embodiments are thus illustrative of the invention which may be modified within the scope of the appended claims.

The embodiments of the invention in which an exclusive property or privilege is claimed are defined as follows:

1. In an electromagnetic clutch or brake of the type having a plurality of radially spaced armature rings which are mounted by a spring arrangement on one of two relatively rotatable members and which on energization of a solenoid mounted on the other member are caused to separately frictionally engage respective pole faces on said other member and commonly frictionally engage an interpole ring on said other member with the establishment thereby of a magnetic flux path and then on deenergization are caused to disengage therefrom by the spring arrangement against the resistance of residual magnetism: an improved spring mounting and armature ring arrangement comprising in combination, spring means mounting said armature rings on said one member so that there is relatively small spring resistance to conjoint engagement travel of all said armature rings and a large spring resistance to engagement travel of the radially outermost armature ring relative to the other armature ring and said radially outermost armature ring having substantially more engagement travel than said other armature ring so that on energization said other armature ring engages before said radially outermost armature ring with overcoming first of said small spring resistance followed by overcoming of said large spring resistance as said radially outermost armature ring is brought to engagement whereby on deenergization the relatively large spring force thus stored in said spring means is effective to overcome the residual magnetism and cause said radially outermost armature ring to first disengage whereupon there is effected an air gap in the magnetic flux path to dissipate such residual magnetism to permit said other armature ring to then be disengaged with just the small spring force of said spring means.

2. In electromagnetic clutch or brake of the type having radially spaced inner and outer armature rings which are mounted by a spring arrangement on one of two relatively rotatable members and which on energization of a solenoid mounted on the other member are caused to separately frictionally engage respective pole faces on said other member and commonly frictionally engage an interpole ring on said other member with the establishment thereby of a magnetic flux path and then on deenergization are caused to disengage therefrom by the spring arrangement against the resistance of residual magnetism: an improved spring mounting and inner and outer armature ring arrangement comprising in combination, a plurality of leaf springs each fixed at spaced points along the length thereof to said one member and said inner and outer armature rings so that with respect to each spring there is a long effective leaf spring section between said one member and said outer armature ring and short effective leaf spring section between said inner and outer armature rings, and said outer armature ring having substantially more engagement travel than said inner armature ring so that on energization said inner armature ring engages before said outer armature ring with deflection first of said long leaf spring sections followed by deflection of said short leaf spring sections as said outer armature ring is brought to engagement whereby on deenergization the relatively large spring force thus stored in said short leaf spring sections is effective to overcome the residual magnetism and cause said outer armature ring to first disengage whereupon there is effected an air gap in the magnetic flux path to dissipate such residual magnetism to permit said inner armature ring to then be disengaged with just the small spring force of said long leaf spring sections.

3. In an electromagnetic clutch or brake of the type having radially spaced inner and outer armature rings which are mounted by a spring arrangement on one of two relatively rotatable members and which on energization of a solenoid mounted on the other member are caused to separately frictionally engage respective pole faces on said other member and commonly frictionally engage an interpole ring on said ohter member with the establishment thereby of a magnetic flux path and then on deenergization are caused to disengage therefrom by the spring arrangement against the resistance of residual magnetism: an improved spring mounting and inner and outer armature ring arrangement comprising in combination, at least three leaf springs each fixed at spaced points along the length thereof to said one member and said inner and outer armature rings so that with respect to each spring there is a long effective leaf spring section between said one member and said outer armature ring and a short effective leaf spring section between said inner and outer armature rings, and said outer armature ring being thinner than said inner armature ring so as to require substantially more engagement travel than said inner armature ring so that on energization said inner armature ring engages before said outer armature ring with deflection first of said long leaf spring sections followed by deflection of said short leaf spring sections as said outer armature ring is brought to engagement whereby on deenergization the relatively large spring force thus stored in said short leaf spring sections is effective to overcome the residual magnetism and cause said outer armature ring to first disengage whereupon there is effected an air gap in the magnetic flux path to dissipate such residual magnetism to permit said inner armature ring to then be disengaged with just the small spring force of said long leaf spring sections.

* * * * *

UNITED STATES PATENT AND TRADEMARK OFFICE
CERTIFICATE OF CORRECTION

PATENT NO. : 4,337,855
DATED : July 6, 1982
INVENTOR(S) : George T. Bennett

It is certified that error appears in the above—identified patent and that said Letters Patent is hereby corrected as shown below:

Column 1, line 64, "armawture" should read -- armature --.

Column 6, line 11, "ohter", should read -- other --.

Signed and Sealed this

Twenty-first Day of September 1982

[SEAL]

Attest:

GERALD J. MOSSINGHOFF

Attesting Officer

Commissioner of Patents and Trademarks